US010568462B2

(12) United States Patent
Casey

(10) Patent No.: US 10,568,462 B2
(45) Date of Patent: Feb. 25, 2020

(54) CONTAINER WITH MIXING BLADE

(71) Applicant: DryBev International, Inc., Charlestown (KN)

(72) Inventor: Theodore Casey, Dallas, TX (US)

(73) Assignee: DryBev International, Inc., Charlestown (KN)

( * ) Notice: Subject to any disclaimer, the term of this patent is extended or adjusted under 35 U.S.C. 154(b) by 552 days.

(21) Appl. No.: 14/593,771

(22) Filed: Jan. 9, 2015

(65) Prior Publication Data
US 2016/0198904 A1   Jul. 14, 2016

(51) Int. Cl.
*A47J 43/27* (2006.01)

(52) U.S. Cl.
CPC ................... *A47J 43/27* (2013.01)

(58) Field of Classification Search
CPC ........................................ A47J 43/27
USPC ......................................... 366/130
See application file for complete search history.

(56) References Cited

U.S. PATENT DOCUMENTS

| 937,049 A | 10/1909 | Callahan | |
|---|---|---|---|
| 1,661,336 A * | 3/1928 | Katz | A47J 43/27 206/217 |
| 1,966,611 A * | 7/1934 | Cobel | A47J 43/27 210/244 |
| 2,433,248 A * | 12/1947 | Sweier, Jr. | A47J 43/27 366/130 |
| 3,220,588 A * | 11/1965 | Lipari | A61J 1/2093 206/222 |
| 3,613,955 A | 10/1971 | Wetherell, Jr. | |
| 3,924,741 A * | 12/1975 | Kachur | B65D 51/2892 206/221 |
| 4,193,698 A * | 3/1980 | Gartner | B01F 7/0005 206/219 |

(Continued)

FOREIGN PATENT DOCUMENTS

| EP | 0190593 A2 | 8/1986 |
|---|---|---|
| GB | 1201539 A | 8/1970 |
| JP | 2003081357 A | 3/2003 |

OTHER PUBLICATIONS

European Search Report for related Application No. EP16177116.7 dated Feb. 28, 2017; 7 pgs.

(Continued)

*Primary Examiner* — Abbas Rashid
(74) *Attorney, Agent, or Firm* — Griffith Barbee PLLC

(57) ABSTRACT

A container system for separately storing and mixing two or more substances. The container system comprises a mixing container having a main container that stores one or more first substances. The main container has a first upper opening. The container system also includes a storage repository coupled to main container, and which stores one or more second substances. The storage repository includes a lip defining a second upper opening, which has an outside diameter smaller than the diameter of the first upper opening. Additionally, the container system includes a mixing blade having an outside diameter smaller than the diameter of the first upper opening. The mixing blade also has a plurality of openings. The container system includes a releasable liner placed over the storage repository's lip, and the storage repository's lip forms a seal with a lower surface of the releasable liner.

16 Claims, 8 Drawing Sheets

(56) References Cited

U.S. PATENT DOCUMENTS

| | | | |
|---|---|---|---|
| 4,272,199 A * | 6/1981 | Hade | B01F 11/0054 |
| | | | 206/222 |
| 4,819,819 A * | 4/1989 | Robertson, Jr. | B65D 47/103 |
| | | | 215/230 |
| 5,114,011 A | 5/1992 | Robbins, III | |
| 5,735,320 A * | 4/1998 | Tune | B65D 81/3222 |
| | | | 141/100 |
| 5,950,819 A | 9/1999 | Sellars | |
| 5,984,141 A | 11/1999 | Gibler | |
| 6,047,818 A | 4/2000 | Warby et al. | |
| 6,059,443 A * | 5/2000 | Casey | A45F 3/16 |
| | | | 206/219 |
| 6,152,296 A * | 11/2000 | Shih | B65D 51/2835 |
| | | | 206/222 |
| 6,257,428 B1 | 7/2001 | Caola | |
| 6,379,032 B1 * | 4/2002 | Sorensen | B01F 13/002 |
| | | | 366/130 |
| 6,527,110 B2 | 3/2003 | Moscovitz | |
| 6,616,319 B2 * | 9/2003 | Renz | A61J 9/00 |
| | | | 215/11.1 |
| 6,786,330 B2 | 9/2004 | Mollstam et al. | |
| 6,840,373 B2 | 1/2005 | Gibler et al. | |
| 6,854,595 B2 * | 2/2005 | Kiser | B65D 51/2878 |
| | | | 206/219 |
| 6,994,211 B2 | 2/2006 | Cho | |
| 7,055,685 B1 | 6/2006 | Patterson et al. | |
| 7,503,453 B2 | 3/2009 | Cronin et al. | |
| 7,523,823 B1 | 4/2009 | Bednar | |
| 7,568,576 B2 * | 8/2009 | Sweeney, Jr. | B65D 51/2864 |
| | | | 206/219 |
| 7,588,142 B1 | 9/2009 | Bush | |
| 7,614,496 B2 | 11/2009 | Dvorak et al. | |
| 7,614,513 B2 | 11/2009 | Anderson | |
| 7,823,723 B2 * | 11/2010 | Anthony | B65D 5/748 |
| | | | 206/219 |
| 8,523,837 B2 * | 9/2013 | Wiggins | B65D 51/225 |
| | | | 206/221 |
| 8,701,906 B1 * | 4/2014 | Anderson | B65D 41/20 |
| | | | 206/220 |
| 8,720,680 B2 | 5/2014 | Casey | |
| 8,757,408 B2 * | 6/2014 | Joubert | B65D 23/085 |
| | | | 215/227 |
| 8,801,688 B2 | 8/2014 | Wiggins et al. | |
| 8,960,424 B1 * | 2/2015 | Anderson | B65D 51/2835 |
| | | | 206/219 |
| 9,242,772 B1 * | 1/2016 | Anderson | B65D 51/2835 |
| 2002/0118595 A1 | 8/2002 | Miller et al. | |
| 2004/0149599 A1 * | 8/2004 | Cho | B65D 51/2892 |
| | | | 206/219 |
| 2006/0283726 A1 | 12/2006 | McCloud | |
| 2007/0199838 A1 * | 8/2007 | Oh | B65D 81/3222 |
| | | | 206/219 |
| 2007/0227919 A1 | 10/2007 | True | |
| 2008/0156674 A1 | 7/2008 | Correale et al. | |
| 2008/0202950 A1 | 8/2008 | Anderson | |
| 2009/0065379 A1 * | 3/2009 | Casey | B65D 81/3283 |
| | | | 206/221 |
| 2010/0108715 A1 | 5/2010 | Santagiuliana | |
| 2012/0103841 A1 | 5/2012 | Winkler | |
| 2012/0204578 A1 * | 8/2012 | Leavitt | F25D 5/02 |
| | | | 62/4 |
| 2013/0226148 A1 * | 8/2013 | Machan | A61M 5/31596 |
| | | | 604/518 |
| 2013/0279287 A1 * | 10/2013 | Cerasani | B65D 47/0885 |
| | | | 366/130 |
| 2015/0016208 A1 | 1/2015 | Larson et al. | |

OTHER PUBLICATIONS

English Translation of Abstract JP2003081357A, published Mar. 19, 2003, obtained from the European Patent Office (1 page).
PCT International Search Report for related PCT/US16/41558, dated Nov. 7, 2016, 5 pages.
PCT Written Opinion of the International Search Authority for related PCT/US16/41558, dated Nov. 7, 2016, 6 pages.
Machine Translation dated Aug. 31, 2016 of CN102126288B, published May 7, 2014, 6 pages.
Machine Translation of Abstract EP0190593, obtained from Espacenet on Nov. 30, 2016, 2 pages.

* cited by examiner

CONTAINER WITH MIXING BLADE

TECHNICAL FIELD

Disclosed herein is a method and system for separately storing and mixing two or more substances.

DESCRIPTION OF RELATED ART

There exist prior art systems for separately storing and mixing two or more substances. Examples include the systems described in U.S. Pat. Nos. 6,059,443, 7,861,855 B2, 8,720,680 B2, and European Patent No. EP 2190751B1, the disclosures of which are incorporated by reference. Disclosed herein is an improved method and system for separately storing and mixing two or more substances.

SUMMARY OF THE DISCLOSURE

In one aspect, what is disclosed herein is a container system. The container system includes a mixing container having a main container that stores one or more first substances. The main container has a first upper opening. The container system also includes a storage repository coupled to main container, and which stores one or more second substances. The storage repository includes a lip defining a second upper opening, which has an outside diameter smaller than the diameter of the first upper opening. Additionally, the container system includes a mixing blade having an outside diameter smaller than the diameter of the first upper opening and an inside diameter smaller than the outside diameter of the storage repository's lip. The mixing blade also has a plurality of openings. Furthermore, the container system includes a releasable liner placed over the storage repository's lip, and the storage repository's lip forms a seal with a lower surface of the releasable liner.

In another aspect, presently disclosed is a method of separately storing one or more first substances and one or more second substances, and mixing the substances at the time of usage of a product comprising a mixture of the substances. The method involves agitating the container system after removal of the releasable liner so that the one or more first substances and one or more second substances are permitted to mix with another.

BRIEF DESCRIPTION OF THE DRAWINGS

The disclosure will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
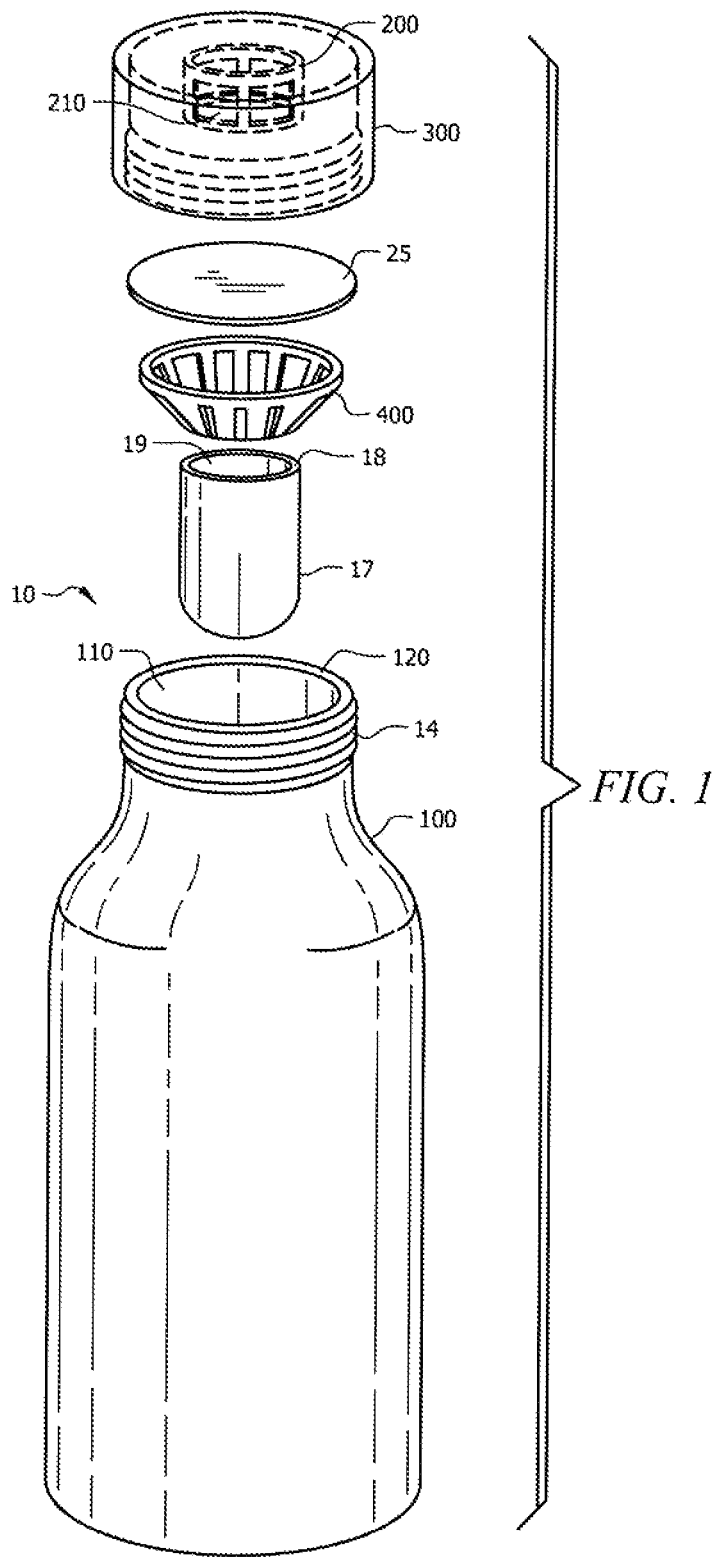
FIG. 1 is an exploded perspective view of a preferred embodiment of the container system of the present disclosure.

Referring to FIGS. 1-7, a preferred storage and mixing container 10 comprises a bottle 100 for containing one or more first substances, such as a liquid 33, a storage repository 17 for containing one or more second substances, such as a powder 35. The storage repository 17 is disposed within an upper opening 110 of the bottle 100 and coupled to the neck 120 of the bottle 100. This preferred embodiment includes a releasable liner 25 to cover a second upper opening 19 of the storage repository 17 when the container 10 is used to separately store the powder 35 from the liquid 33, and a cap 300 including a mixing blade 200 that couples to the bottle 100, such as by threads 14.

As depicted in FIGS. 1-3 and FIGS. 5-6, the cap 300 may comprise an element 200, sometimes referred to as a mixing blade, which is generally centrally located within the interior of the cap 300. As shown, the element 200 may be generally ring-shaped and have substantially the same diameter as the lip 18 defining an upper opening to the storage repository 17. Further, the element 200 may comprise ports 210 through the walls thereof. One of ordinary skill in the art will appreciate element 200 can be implemented in shapes other than circular shapes, such as a square, rectangle, pentagon, and the like; if non-circular shapes are used for element 200, lip 18 should be formed so that it generally matches the non-circular shape of and has the same perimeter as element 200.

Figure 1A:
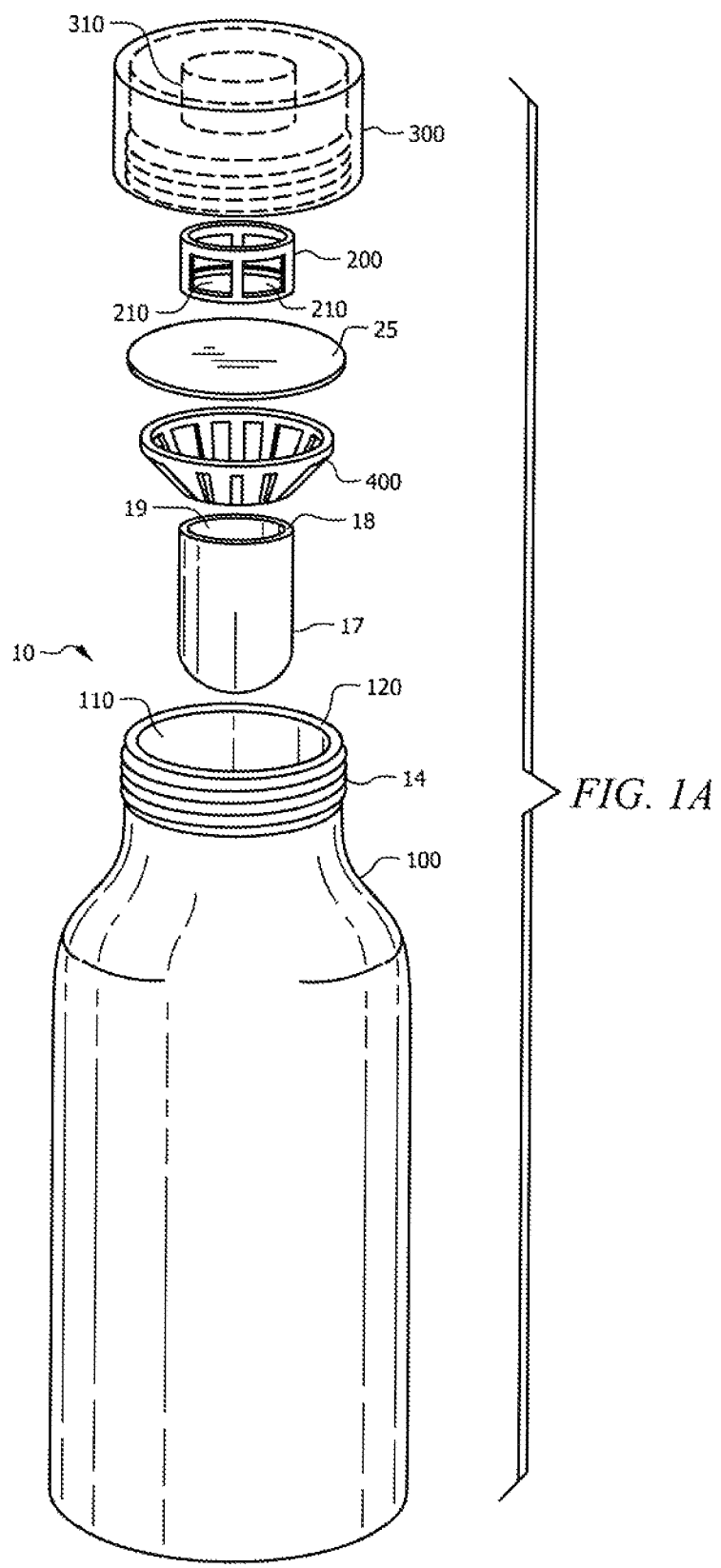
FIG. 1A is an exploded perspective view of an alternative embodiment of the container system of the present disclosure.
Figure 2:
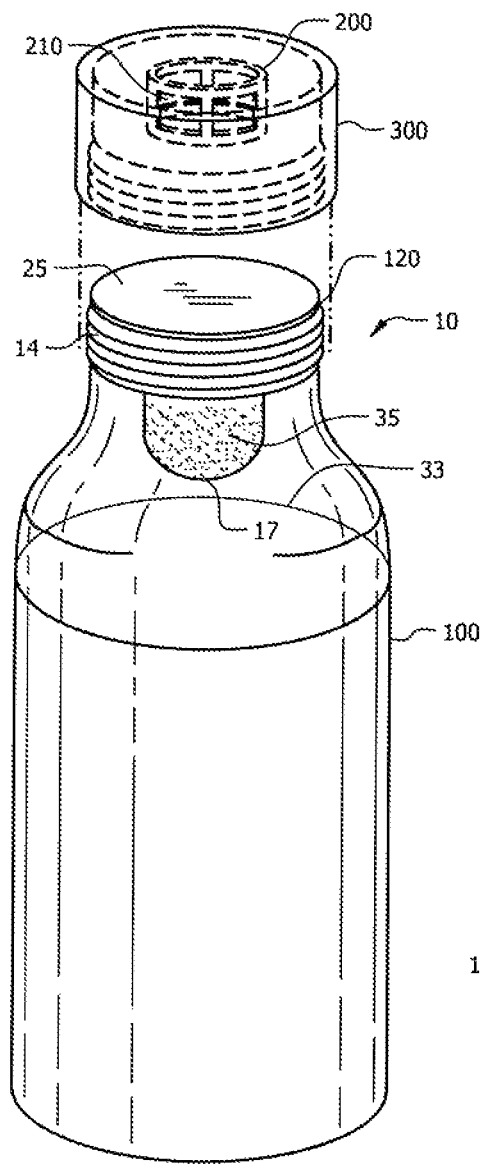
FIG. 2 is a perspective view of a preferred embodiment of the container system of the present disclosure with the storage repository covered by a releasable liner.
Figure 3:
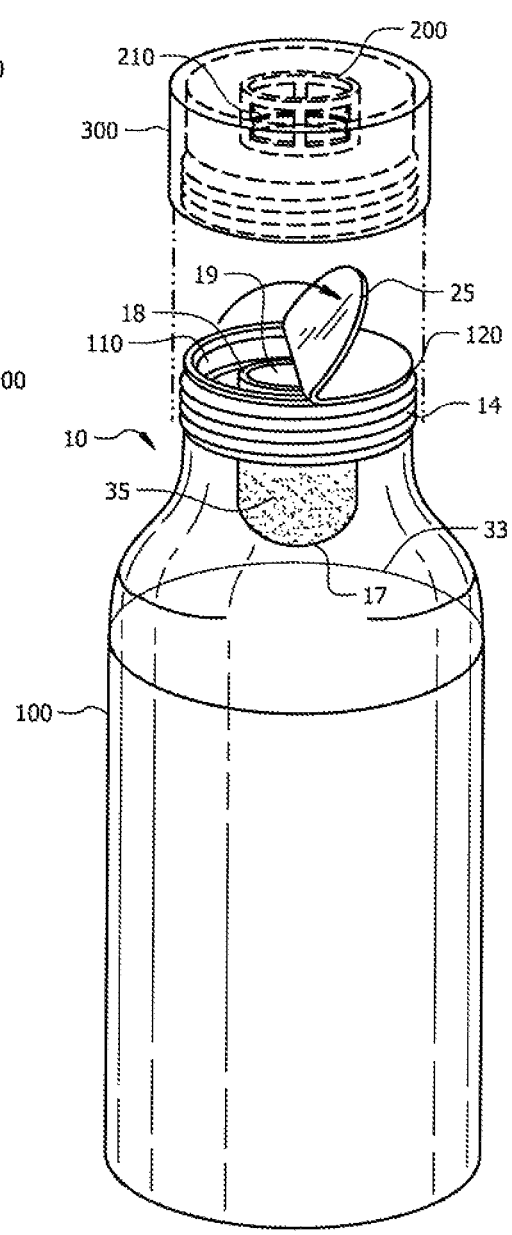
FIG. 3 is a perspective view of a preferred embodiment of the container system of the present disclosure showing the releasable liner being released.
Figure 4:
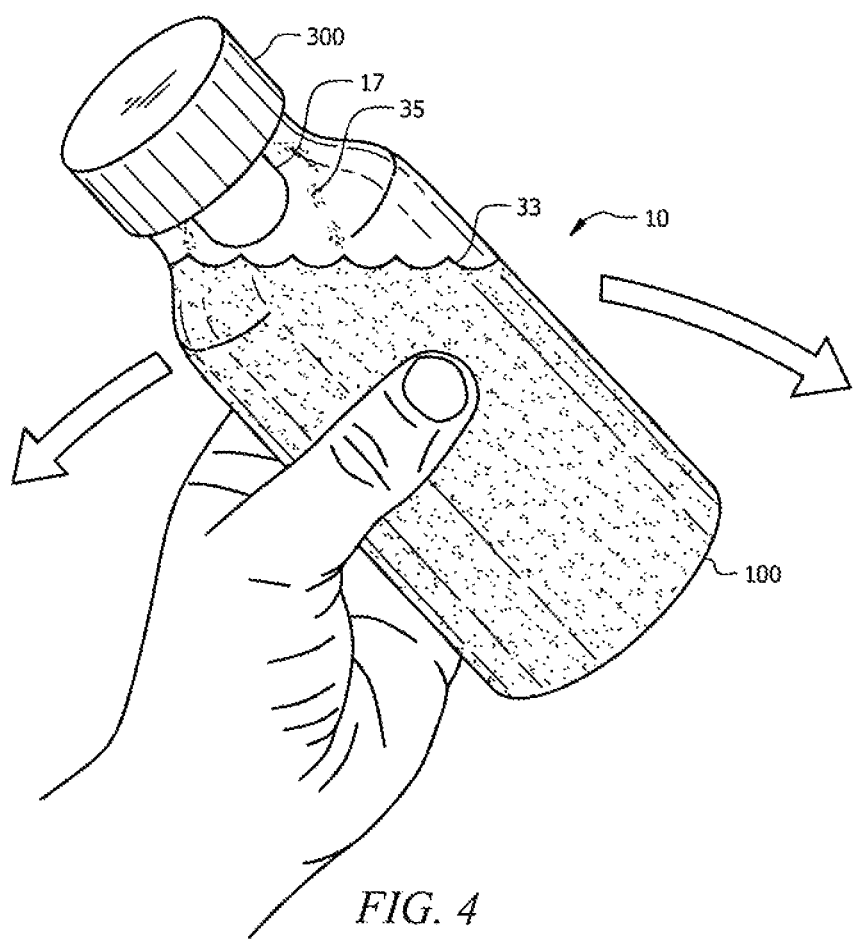
FIG. 4 is a view of the container system showing the container system being agitated so that the one or more first substances and one or more second substances are mixed.
Figure 5:
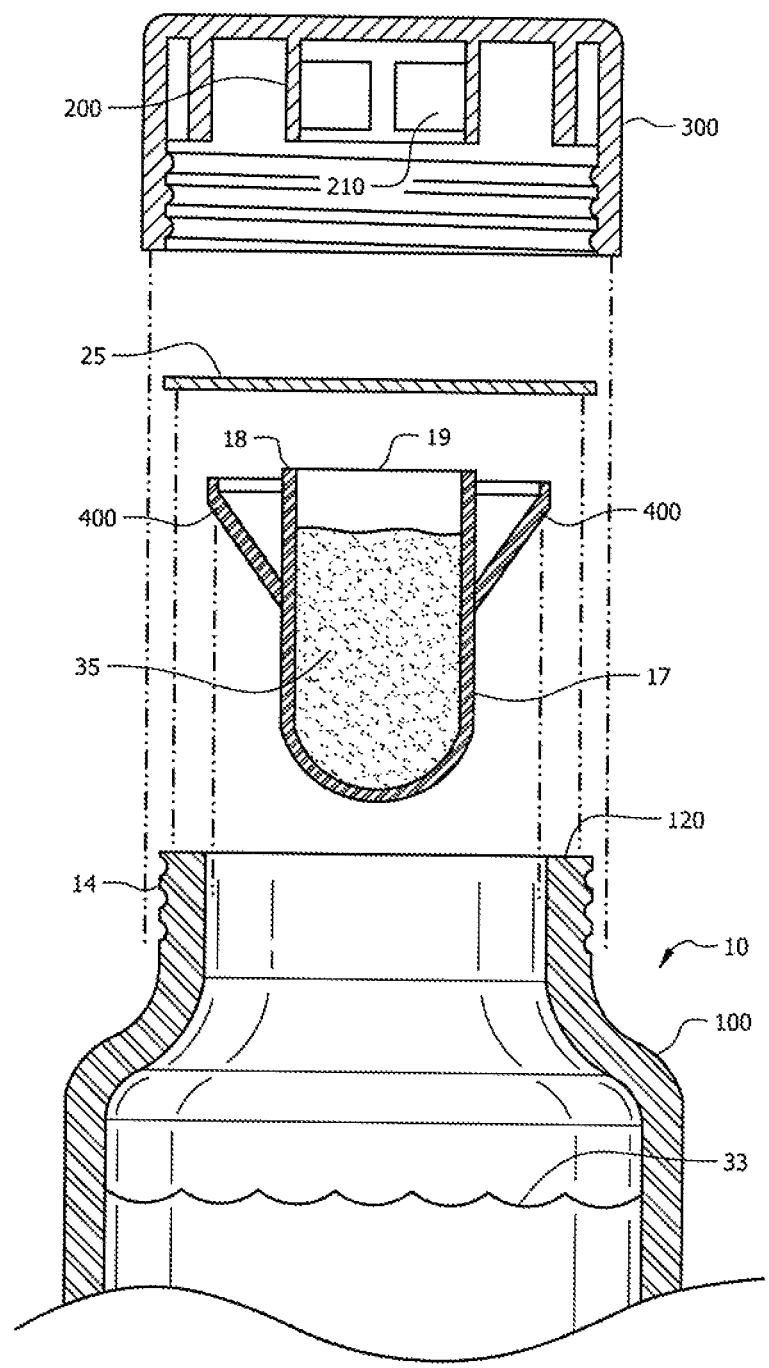
FIG. 5 is an exploded, front elevational, cross-sectional view of a preferred embodiment of the container system of the present disclosure.

In various implementations, the element 200 may be formed integrally within the cap 300, as shown in FIG. 1, or the element 200 may be formed separately from the cap 300 and secured within a ring 310 disposed in cap 300, as shown in FIG. 1A. In the implementation of FIG. 1A, the element 200 may be secured within the ring 310 via interference fit and/or otherwise coupled to the cap 300 adhesively, mechanically, magnetically or by other means that will be apparent to one of ordinary skill in the art.

As depicted in FIGS. 1 and 1A, the container system includes one or more couplings 400 used so that the storage repository 17 will be disposed within an upper opening of the bottle 100 and coupled to the neck 120 of the bottle 100. Disposition of the storage repository 17 within the bottle 100 is depicted in FIGS. 6 and 7.

Figure 6:
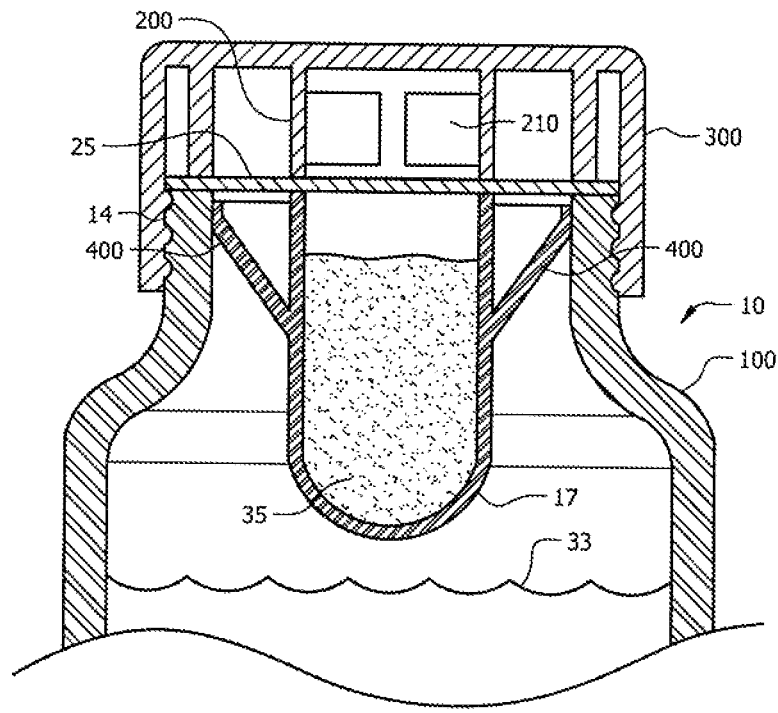
FIG. 6 is a front elevational, cross-sectional view of a preferred embodiment of the container system of the present disclosure with the releasable liner placed over the storage repository.

As depicted in FIG. 6, when the cap 300 is coupled to the bottle 100 while the releasable liner 25 is present, and the mixing blade 200 is contacting an upper surface of the releasable liner 25, a seal is formed between a lower surface of the releasable liner 25 and the lip 18 of the storage repository 17. The seal prevents the one or more first substances 33 from mixing with the one or more second substances 35. As shown in FIG. 6, the cap 300 is coupled to the bottle 100 using threads, but one of ordinary skill in the art will appreciate any number of other means can be used to couple cap 300 to bottle 100.

Figure 7:
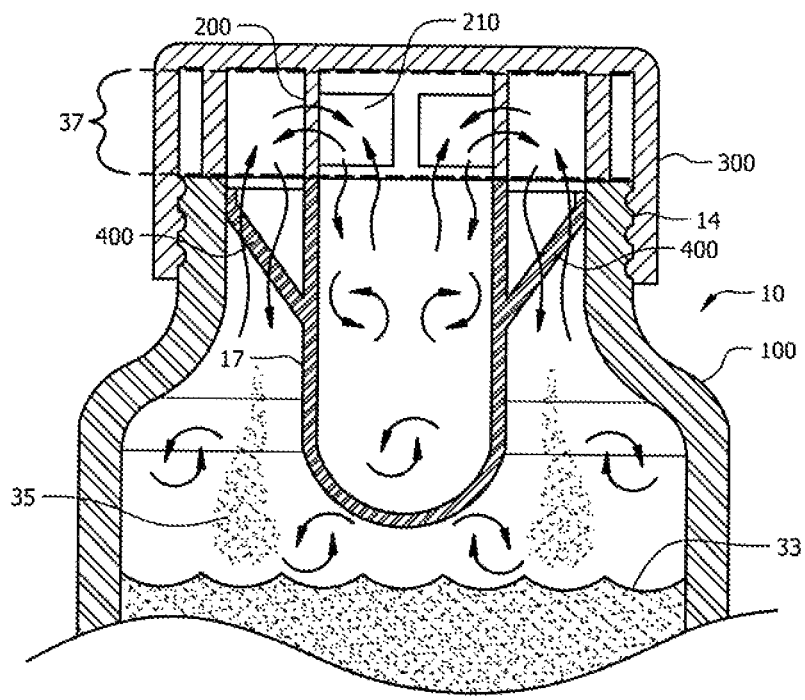
FIG. 7 is a front elevational, cross-sectional view of a preferred embodiment of the container system of the present disclosure with the releasable liner removed.

FIG. 7 depicts the container system when the releasable liner 25 has been removed. A gap 37 is provided, comprising space above the one or more couplings, continuing above the upper opening 110 of the bottle 100, and below an interior surface of the top of the cap 300, through ports 210, and into additional open space inside mixing blade 200. The gap 37 provides additional space to facilitate mixing of liquid 33 and powder 35. When releasable liner 25 has been removed, liquid 33 may move between the bottle 100, gap 37, and storage repository 17 by passing through the one or more couplings 400 and ports 210 of the mixing blade 200. Likewise, when releasable liner 25 has been removed, powder 35 may move between the storage repository 17, gap 37, and the bottle 100 by passing through ports 210 of the mixing blade 200 and the one or more couplings 400. Such mixing is depicted in FIG. 7, and occurs when, for example, the bottle 100 is shaken, inverted, or otherwise agitated, one example of such agitation being depicted in FIG. 4.

In a preferred embodiment, as depicted in FIGS. 6 and 7, mixing blade 200 may have substantially the same height as the height of the space created between the upper opening 110 of the bottle 100 and the interior surface of the top of the cap 300, and the diameter of the mixing blade may have substantially the same diameter as the diameter of the lip 18 of the storage repository 17. One of ordinary skill in the art will appreciate that mixing blade 200 can be designed with ports 210 having virtually any shape, including polygonal shapes such as rectangles, squares, and triangles, or curved shapes, such as circles. Also, the number of ports 210 that may be used is not limited to the number depicted in FIGS. 1-3.

Figure 8A:
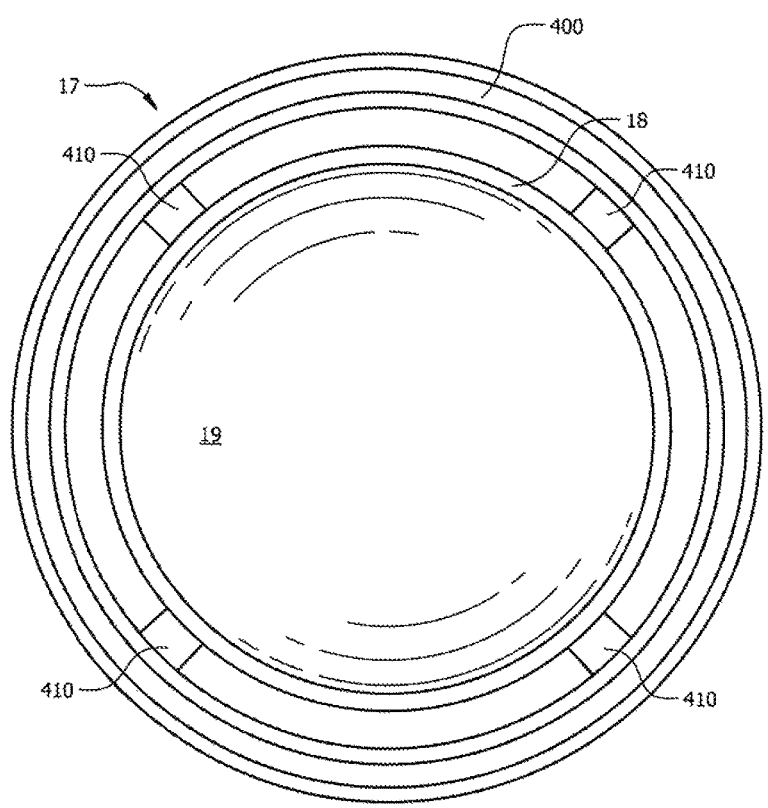
FIG. 8A is a top, or overhead, view of the storage repository of a preferred embodiment of the container system of the present disclosure.
Figure 8B:
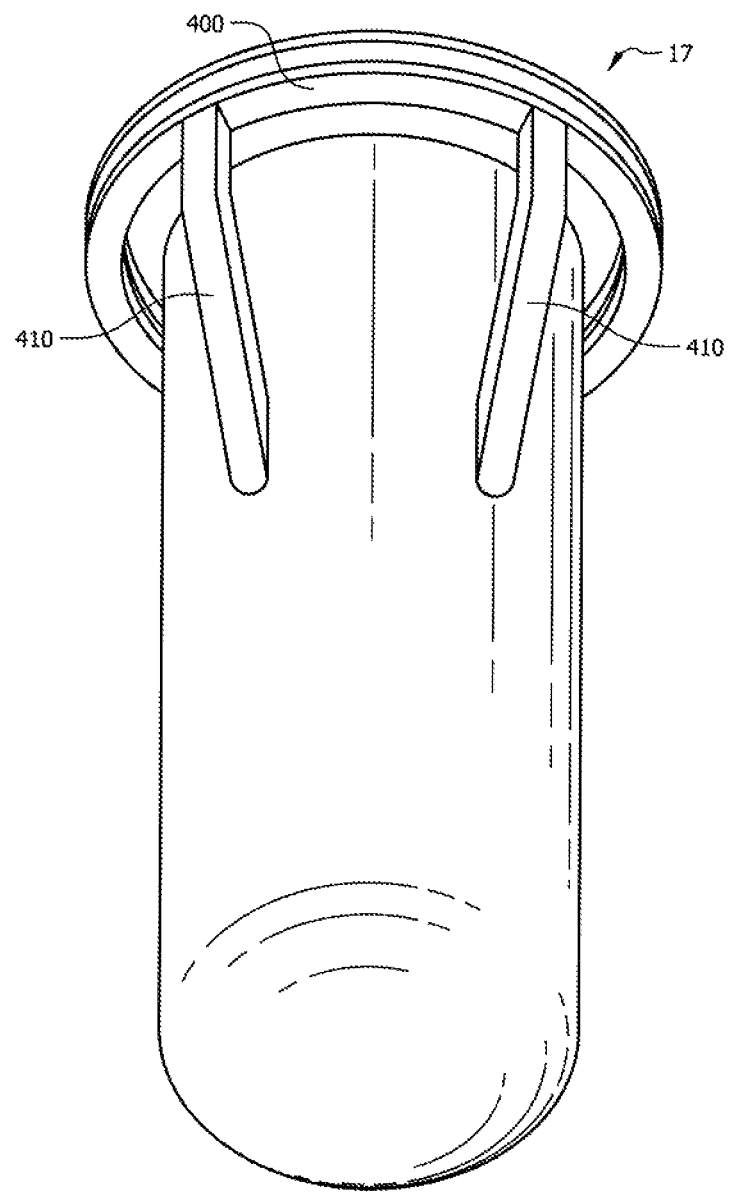
FIG. 8B is a perspective view of the storage repository of a preferred embodiment of the container system of the present disclosure.

While the one or more couplings 400 may not be designed so that the one or more first substances and one or more second substances are completely prevented from moving between the bottle 100 and storage repository 17, one of ordinary skill in the art will appreciate that various couplings may be used to couple the storage repository 17 to the neck 110 of bottle 100. Couplings 400 may consist of a single piece of material having ports through which the one or more first and second substances may move, or, as depicted in FIGS. 8A and 8B, multiple pieces of material, such as support arms 410, that are placed apart from one another to create space through which the one or more first and second substances may move. Also, couplings 400 may be manufactured as one piece with the storage repository 17 or bottle 100, or may be separate components.

The one or more first substances and the one or more second substances may each be in solid form, liquid form, or some combination thereof. Examples of substances that may be used in connection with the container system include but are not limited to the following substances: water, dehydrated substances, preservative free substances, dietary supplement mixtures, nutritional mixtures, protein mixtures, dairy based proteins, milk proteins, whey proteins, vegetable based proteins, soy based proteins, amino-acids, beta alanine, vitamins, minerals, creatine, glutamine, L-arginine, phenylalanine, L-Leucine, L-Isoleucine, L-yaline, synephrine, yohimbe, ginseng, ascorbic acid, hydroxyl citric acid, aloe vera, dimethylamyamine, polysaccharide, monosaccharide, maltodextrin, dextrose, fructose, silicon, artificial sweeteners, natural sweeteners, sucralose, artificial or natural flavors, artificial or natural colors, tea, coffee, dairy product, or any other substances which may be consumed by a user either alone, or in combination with any other chemical or other substance.

The bottle 100 and storage repository 17 may be constructed of any material suitable for storing liquid or solid substances. In a preferred embodiment, the bottle 100 is manufactured of polyethylene terephthalate (PET). One of ordinary skill in the art will appreciate that other materials also could be used to manufacture said bottle 100 or storage repository 17, such as other plastics (including High Density Polyethylene and polypropylene), glass, metal, styrofoam and the like. It is contemplated that alternate embodiments of the container system may be constructed of materials suitable for heating within a microwave oven or other heating apparatus. Cap 300, mixing blade 200, and the one or more couplings 400 may likewise be constructed of any suitable materials, including those identified above.

The purpose of releasable liner 25 is to prevent the mixing of the one or more first substances and the one or more second substances. One of ordinary skill in the art will therefore appreciate releasable liner 25 can be implemented in the container system of the present disclosure in many different ways. Releasable liner 25 may cover first upper opening 110 of the bottle 100 and the second upper opening 19 of storage repository 17, but one of ordinary skill in the art will appreciate releasable liner 25 need only cover second upper opening 19. Releasable liner 25 may be a gasket, i.e., it may be loosely placed over second upper opening 19 in the absence of cap 300 being placed on bottle 100, so that the releasable liner 25 might fall off when cap 300 is removed. Or, releasable liner 25 might be coupled to bottle 100 and/or lip 18 using an adhesive. Releasable liner 25 could even be formed in the shape of a sphere, such as a marble, or a spherical cone, and be disposed in second upper opening 19 of storage repository 17.

It is believed the operation and construction of the apparatus and method disclosed herein will be apparent from the foregoing description. While the apparatus and method shown and described has been characterized as being preferred, it will be readily apparent that various changes and modifications could be made without departing from the spirit and scope of the disclosure.

The invention claimed is:

1. A container system for mixing two or more substances comprising:
   (a) a main container for holding one or more first substances, said main container having a first upper opening;
   (b) a storage repository for holding one or more second substances, said storage repository positioned within and coupled to said main container, and including a lip defining a second upper opening, said lip having an outside diameter smaller than the diameter of the first upper opening;
   (c) a mixing blade, said mixing blade having an outside diameter smaller than the diameter of the first upper opening and an inside diameter smaller than the outside diameter of said lip, said mixing blade having a plurality of openings; and
   (d) a releasable liner covering said second upper opening;
   (e) wherein said lip forms a seal with a lower surface of said releasable liner.

2. The container system of claim 1, wherein at least a portion of said mixing blade contacts said lip after said releasable liner is removed.

3. The container system of claim 1, wherein no portion of said mixing blade contacts said lip after said releasable liner is removed.

4. The container system of claim 1, wherein said first upper opening is formed in a neck of said main container.

5. The container system of claim 4, further comprising: a releasable cap coupled to an outer surface of said neck and having an upper inner surface covering said first upper opening, wherein said mixing blade is coupled to said upper inner surface of said releasable cap.

6. The container system of claim 1, further comprising: a releasable cap coupled to an outer surface of said main container and having an upper inner surface covering said first upper opening, wherein said mixing blade is integrally formed into said upper inner surface of said releasable cap.

7. The container system of claim 1, wherein said storage repository is coupled to said main container by one or more couplings.

8. The container system of claim 7, wherein said one or more couplings comprise a single component surrounding said storage repository, said single component having ports therethrough.

9. The container system of claim 7, wherein said one or more couplings comprise a plurality of support arms spaced apart around said storage repository.

10. The container system of claim 1, wherein said second upper opening is substantially parallel to said first upper opening.

11. The container system of claim 1, wherein said releasable liner is a gasket placed loosely over second upper opening and engaging said lip.

12. The container system of claim 1, wherein said releasable liner is sealed to said lip with an adhesive.

13. The container system of claim 1, wherein said releasable liner is spherical or conical and is disposed in said second upper opening.

14. A container system for mixing two or more substances comprising:
(a) a main container for holding one or more first substances;
(b) a storage repository for holding one or more second substances, said storage repository coupled within said main container by one or more couplings;
(c) a releasable liner for closing said storage repository to prevent said second substances from mixing with said first substances; and
(d) a mixing blade having a plurality of openings.

15. The container system of claim 14, wherein said plurality of openings in said mixing blade aid in mixing said second substances with said first substances when said releasable liner is removed to open said storage repository and said container system is shaken.

16. The container system of claim 14, wherein said one or more couplings form openings that aid in mixing said second substances with said first substances when said releasable liner is removed to open said storage repository and said container system is shaken.

* * * * *